United States Patent [19]

Chaya et al.

[11] Patent Number: 5,611,693
[45] Date of Patent: Mar. 18, 1997

[54] IMAGE KARAOKE DEVICE

[75] Inventors: Norio Chaya; Hiroshi Nishikawa; Koichi Hayashi, all of Nagoya; Hiroyuki Takada, Aichi-ken; Yasutada Aoyama, Inazawa; Yasuhiro Funahashi; Osamu Nishimura, both of Nagoya, all of Japan

[73] Assignees: Brother Kogyo Kabushiki Kaisha; Xing, Inc., both of Nagoya, Japan

[21] Appl. No.: 262,832

[22] Filed: Jun. 21, 1994

[30] Foreign Application Priority Data

Jun. 22, 1993 [JP] Japan .................................. 5-150866
Jan. 26, 1994 [JP] Japan .................................. 6-007070
Jan. 31, 1994 [JP] Japan .................................. 6-009438

[51] Int. Cl.⁶ .............................. G09B 5/08; G10H 1/38
[52] U.S. Cl. ..................... 434/307 A; 434/318; 84/610; 369/34; 348/571; 386/102
[58] Field of Search ............................. 434/307 R–390, 434/318, 365; 84/447 R, 601, 603, 609, 610, 625, 630, 631, 634, 645; 369/2, 48, 178, 192, 34; 360/32, 33.1, 49, 70, 77.01; 345/141, 143, 147; 348/678, 488, 571; 381/81

[56] References Cited

U.S. PATENT DOCUMENTS

| | | | |
|---|---|---|---|
| 4,528,643 | 7/1985 | Freeny, Jr. ............................... | 364/468 |
| 4,792,934 | 12/1988 | Masaki ..................................... | 369/34 |
| 5,131,311 | 7/1992 | Murakami et al. . | |
| 5,233,438 | 8/1993 | Funahashi et al. . | |
| 5,247,126 | 9/1993 | Okamura et al. ................... | 434/307 A |
| 5,252,775 | 10/1993 | Urano . | |
| 5,262,765 | 11/1993 | Tsumura et al. ....................... | 345/122 |
| 5,293,358 | 3/1994 | Krause ................................ | 434/308 X |
| 5,410,097 | 4/1995 | Kato et al. .............................. | 84/610 |

FOREIGN PATENT DOCUMENTS

| | | |
|---|---|---|
| 0488684A1 | 6/1992 | European Pat. Off. . |
| 0545635A2 | 6/1993 | European Pat. Off. . |
| 0580361A2 | 1/1994 | European Pat. Off. . |

*Primary Examiner*—Joe Cheng
*Attorney, Agent, or Firm*—Oliff & Berridge

[57] ABSTRACT

A compact image karaoke device with only a small number of image disks which provides the impression of having a great many background images. Two players are provided for reading background images from image disks. Background images are selected from at least one image unit group corresponding to at least one image genre corresponding to selected song genre and are read by the two players and changed at random, for example, every 30 seconds. By editing the display of background images in this manner, a great number of background image series can be obtained for combinations of the background images. Images obtained and displayed corresponding particularly to the starting portion of the song are provided only on the number of images available. Therefore, even if a great number of songs are consecutively selected, a user will not feel as though the same images are being repeatedly shown.

24 Claims, 11 Drawing Sheets

FIG. 6(A)

| TABLE FOR SONG GENRE B ( 1 ≤ R ≤ 24 ) |
|---|
| 1 → B−1<br>2 → B−2<br>3 → B−3<br><br>24 → B−24 |

FIG. 6(B)

| TABLE FOR SONG GENRE AB ( 1 ≤ R ≤ 48 ) |
|---|
| 1 → A−1    25 → B−1<br>2 → A−2    26 → B−2<br>3 → A−3    27 → B−3<br><br>24 → A−24  48 → B−24 |

FIG. 6(C)

| TABLE FOR SONG GENRE CDE ( 1 ≤ R ≤ 72 ) |
|---|
| 1→C−1  25→D−1  49→E−1<br>2→C−2  26→D−2  50→E−2<br>3→C−3  27→D−3  51→E−3<br><br>24→C−24 48→D−24 72→E−24 |

IMAGE KARAOKE DEVICE

BACKGROUND OF THE INVENTION

1. Field of the Invention

The present invention relates to an image karaoke device which plays accompaniment music of a song to be sung while displaying the lyrics of the song and a background image behind the display of the lyrics.

2. Description of the Related Art

Conventionally, there has been known an image karaoke device which reproduces, from a video disk, image, lyric, and music data for each song desired to be sung. Because data for several thousand songs must be stored in each device, an establishment which provides an image karaoke device for its customers must keep an extremely large number of video disks on hand. A special video disk housing case is provided to the image karaoke device for housing several video disks. An autochanger is provided for changing the video disks according to a request by a karaoke user. The space taken up by the autochanger and the special housing case has given rise to a need for a more compact device, especially in establishments that provide karaoke for customers.

U.S. Pat. No. 5,233,438 has proposed a more compact device for solving the above problem, wherein image data is stored separately from song data. A background image formed based on the image data is displayed while the song is played and the lyrics displayed. The image data which becomes the background image is often stored in video disks. Generally two types of image data are stored on each video disk. For example, when one video disk contains two hours of image data, one hour of image data could be devoted to Japanese ballads (i.e., Japanese "enka") and one hour could be devoted to popular songs.

Stated in further detail, a plurality of images, corresponding to either Japanese ballads or popular songs, are stored in approximately four minute segments. Image data for images is retrieved in the order stored. For example, when a user requests two Japanese ballads, then a popular song, a Japanese ballad, and a popular song in that order, first, the first and second sets of image data for Japanese ballads will be retrieved one after the other, then the first set of image data for popular songs, then the third set of image data for Japanese ballads, and finally the second set of image data for popular songs will be retrieved in that order.

However, with the example described above, since one song is about four minutes long, image data sufficient for only 14 to 15 Japanese ballads and the same number of popular songs is provided. Therefore, a person singing frequently will possibly tire of seeing the same background image. Further, the displayed image corresponding to the first portion of song leaves a particularly strong impression. Therefore, when only 14 to 15 image patterns are available for either Japanese ballads or popular songs, users of karaoke will possibly get the impression that the background images are always the same.

In a separate problem, when songs are divided into only two types such as Japanese ballads and popular songs, invariably some background images will be inappropriate for the content or gist of the song being sung. Although Japanese ballads can be handled with a comparatively small number of images, popular songs must include images for a great variety of songs types including animation film songs, children's songs, folk songs, blues, rock and roll, movie theme songs, etc. Also, situations arise when the 14 to 15 image patterns can not cope with situations well, such as when a summer scene appears during a song about winter or when a tranquil scene appears during a up-tempo song.

The images can be divided into further image genre so as to better match the content of each song. However, if, for example, the songs are divided into six genre, only five image patterns can be provided for each genre, giving users of karaoke an even stronger impression of the same images being repeatedly shown.

SUMMARY OF THE INVENTION

It is an objective of the present invention to overcome theses problems, and to provide a karaoke device which stores the small total time of background image information so as to have a small size but which can supply large variety in the background image so that the karaoke user will not tire of the background images.

In order to attain the above object and other objects, the present invention provides an image karaoke device for reproducing music of a song desired to be sung and for displaying an image in synchronization with the music, the image karaoke device comprising: music information storing means for storing information on music of a plurality of songs; song selecting means for selecting a song desired to be sung from the plurality of songs, the music information of which are stored in the music information storing means; music reproducing means for reproducing music of the song selected by the song selection means based on the information stored in the music information storing means; image storing means for storing a plurality of first image unit groups corresponding to a plurality of image types representative of a plurality of image contents, each first image unit group being constructed from a plurality of image units with their image contents being of the corresponding image type; random selecting means for randomly selecting several image units one after another from the image storing means to produce a series of image units; and displaying means for displaying the series of image units, in synchronization with the music reproduced by the music reproducing means.

The music information storing means may further store information on lyrics of the plurality of songs. The displaying means may include: a composite image producing means for composing the lyrics of the song selected by the song selecting means and the series of image units to thereby produce a series of composite images; and a composite image displaying means for displaying the series of composite images in synchronization with the music reproduced by the music reproducing means.

According to another aspect, the present invention provides an image karaoke device for reproducing music of a song desired to be sung and for displaying an image in synchronization with the music, the image karaoke device comprising: music information storing means for storing information on music of a plurality of songs; song selecting means for selecting a song desired to be sung from the plurality of songs, the music information of which are stored in the music information storing means; music playing means for playing music of the song selected by the song selection means based on the information stored in the music information storing means; a plurality of image storing means each for storing a plurality of image units; a plurality of image reading means each for reading out image units from a corresponding one of the plurality of image storing means; control means for controlling the plurality of image reading means to randomly select image units one after another from the corresponding image storing means to produce a series of image units; and displaying means for displaying the series of image units, in synchronization with the music played by the music playing means.

According to a further aspect, the present invention provides an image displaying apparatus, for displaying a series of images, comprising: a plurality of video disks for storing a plurality of images; random selecting means for randomly selecting several video disks one after another from the plurality of video disks to successively reproduce the images from the randomly selected video disks; and displaying means for displaying a series of the thus successively reproduced images.

BRIEF DESCRIPTION OF THE DRAWINGS

The above and other objects, features and advantages of the invention will become more apparent from reading the following description of the preferred embodiments taken in connection with the accompanying drawings in which:

FIG. 6 (A) is a table showing correspondence between chapter numbers and reproduction chapter numbers for a song genre B;

FIG. 6 (B) is a table showing correspondence between chapter numbers and reproduction chapter numbers for song genre AB;

FIG. 6 (C) is a table showing correspondence between chapter numbers and reproduction chapter numbers for song genre CDE;

DETAILED DESCRIPTION OF THE INVENTION

Figure 1:
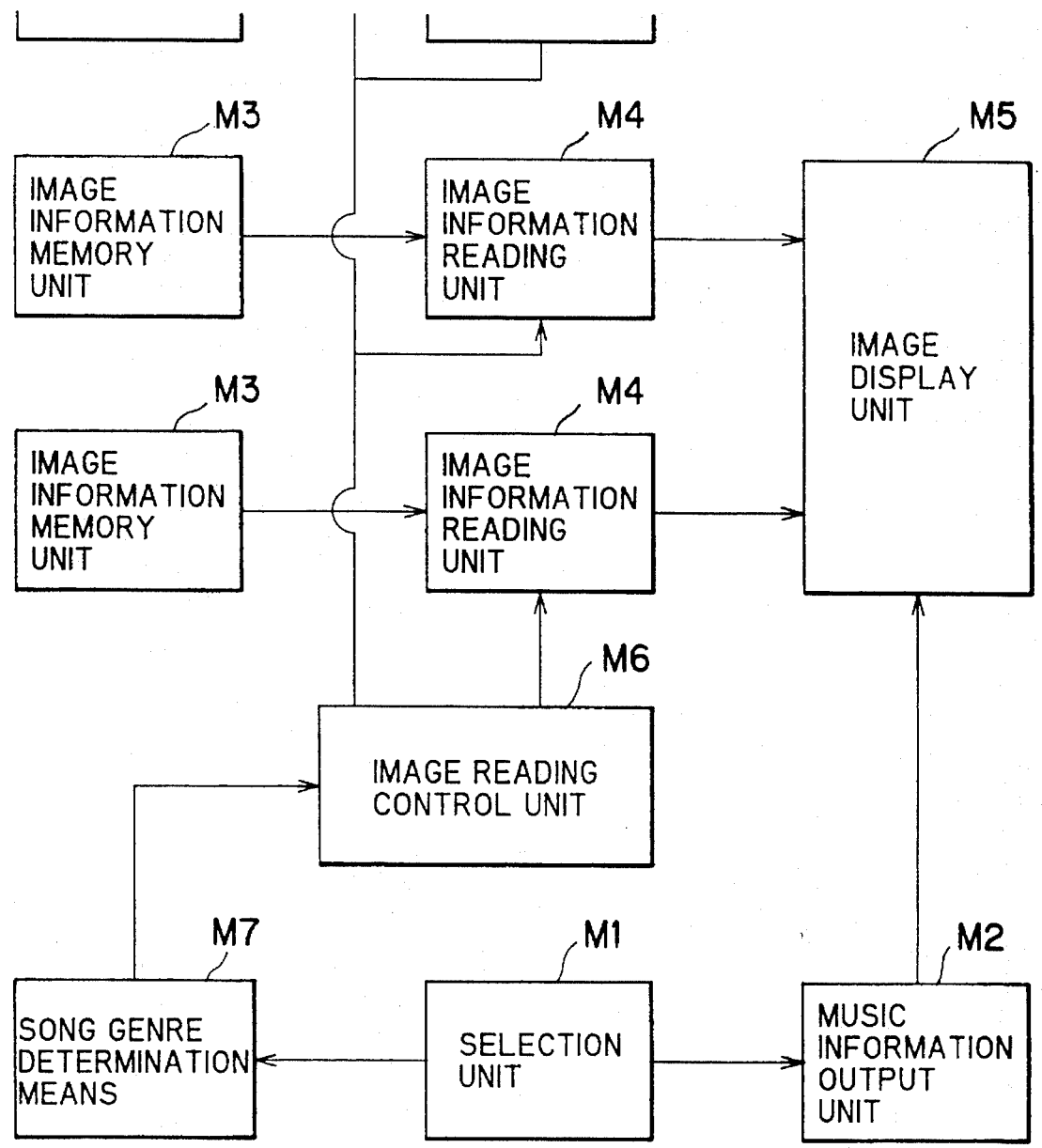
FIG. 1 is a block diagram showing a structure of an image karaoke device according to the present invention.

An image karaoke device according to the present invention will be described below while referring to the accompanying drawings wherein like parts and components are designated by the same reference numerals to avoid duplicating description.

FIG. 1 schematically shows the structure of an image karaoke device of the present invention.

The image karaoke device of the present invention includes: a selection unit M1 for selecting a desired song from a plurality of karaoke songs; a music information output unit M2 for outputting music information of a selected karaoke song to play the music and for outputting lyric information of the selected karaoke song; an image information memory unit M3 for storing image information; an image information reading unit M4 for reading the image information from the image information memory unit; and an image display unit M5 for producing a composite image of the lyric information outputted from the music information output unit M2 and the image information read by the image information unit M4 and displaying the composite image corresponding to the timing as outputted from the music information output unit.

According to the present invention, the image information of the image information memory unit M3 is constructed from a plurality of image units. The image karaoke device of the present invention further includes an image reading control unit M6 for controlling the image information reading unit M4 to randomly select several image units one after another from the image information memory unit M3 to be read out.

Accordingly, the several image units are randomly combined with the lyric information to be serially displayed as background images. For example, by setting each image unit to about 30 seconds long, six images will be combined for one three minute song. By this combination, one series of background images becomes a great variety of types. Because image units capable of being displayed especially at the starting portion of a song are as large as the number of the image units, even though the image information source is a single one, a karaoke user will feel that there are a variety of types of background images. Because of this, even with a small source of image information, background images can be supplied in a manner that will not bore users.

The image information may preferably be structured as a plurality of image groups corresponding to a plurality of image genre. Each of the plurality of image groups is made from the plurality of image units edited as image content of the corresponding image genre. The plurality of image genre are constructed from, for example, five image genre A through E: image genre A with its image content appropriate for winter Japanese ballads; image genre B with its image content appropriate for Japanese ballads with other than winter themes; image genre C with its image content appropriate for up-tempo popular songs; image genre D with its image content appropriate for popular songs other than up-tempo songs; and image genre E with its image content appropriate for general songs.

The image karaoke device of the present invention may further have a song genre determination unit M7 for determining a song genre of a karaoke song selected by the selection unit Mi. It is noted that the plurality of karaoke songs selectable by the selection unit M1 may be classified into ten types of song genres: song genre A which can be suited only to the image genre A (Japanese ballads with a winter theme); song genre B which can be suited only to the image genre B (Japanese ballads with other than a winter theme); song genre AB which can be suited to both the image genres A and B (Japanese ballad with winter and other theme); song genre C which can be suited only to the image genre C (up-tempo popular songs); song genre D which can be suited only to the image genre D (popular songs other than up-tempo songs); song genre E which can be suited only to the image genre E (general songs); song genre CD which can be suited both to the image genres C and D; song genre DE which can be suited both to the image genres D and E; song genre EC which can be suited both to the image genres E and C; and song genre CDE which can be suited all the three image genres C, D and E.

The image reading control unit M6 may control the image information reading unit M4 to randomly select to read several image units one after another from at least one image group with its corresponding image genre suited to the song genre determined by the song genre determination unit M7. For example, when the selected karaoke song is determined to have the song genre B, the image reading control unit M6 controls the image information reading unit M4 to randomly select to read several image units one after another from the image group of the image genre B. When the selected karaoke song is determined to have the song genre CD, the image reading control unit M6 controls the image information reading unit M4 to randomly select to read several image units one after another from the two image groups of the image genres C and D, respectively.

As mentioned already, when the number of image genre are increased, although background images more closely fit the content and gist of songs, the number of images in each genre decreases. However, according to the present invention, even if image units are selected from the same image genre to be combined, the random selection of the image units can basically obtain a great number of types or orders in which the selected image units are combined to form the background image. Depending on the song, even image units of other image genre group can be used. By selecting image units out of a plurality of image genre groups, a greater variety of background images can be obtained.

Accordingly, regardless of the image information source is overall the same, a karaoke user will feel there are a great variety of background images. Also, background images are displayed that are more appropriate to the theme of the song being played. For these reasons, background images can be supplied from a small image information source in a manner that will not bore the user.

The image karaoke device may preferably have a plurality of sets of the image information memory unit M3 and the image information reading unit M4. The image reading control unit M6 may alternately control the plurality of image information reading unit M4 so that each unit M4 may randomly select to read an image unit from the corresponding image information memory unit M3, to thereby cause several image units to be sequentially and continuously read out from the plurality of image information memory unit M3 without any break between the image units.

A first embodiment of the image karaoke device according to the present invention will now be described below while referring to FIGS. 2 through 7.

Figure 2:
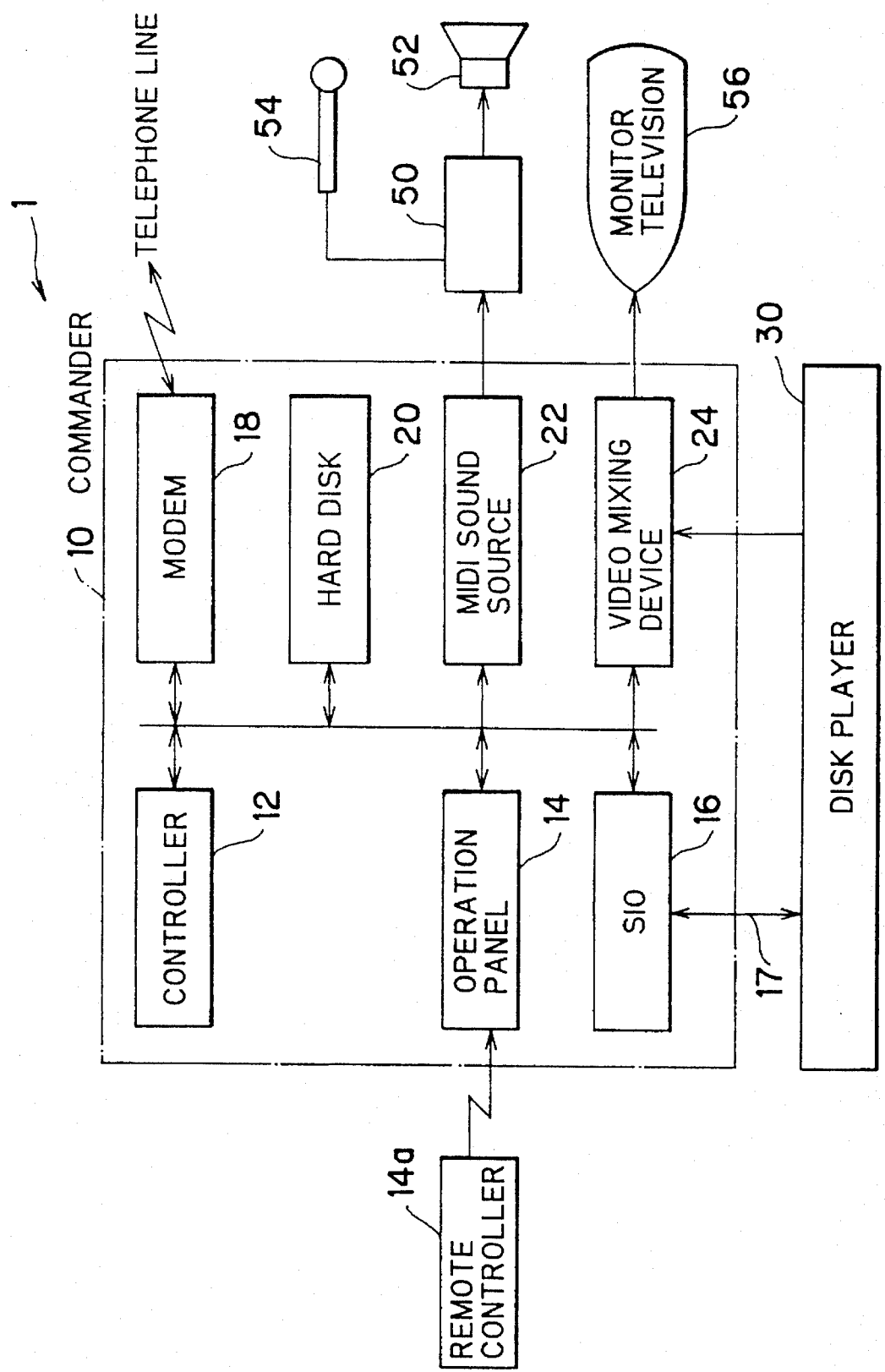
FIG. 2 is a block diagram showing a structure of an image karaoke device according to a first preferred embodiment of the present invention.

As is shown in FIG. 2, the image karaoke device 1 of the first embodiment includes a commander 10, a disk player device 30, an amplifier/mixer 50, a speaker 52, a microphone 54, and a monitor television 56.

As shown in FIG. 2, the commander 10 includes an operation panel 14, a serial input-output circuit (SIO) 16, a modem 18, a hard disk 20, a MIDI sound source 22, a video mixer 24, and a controller 12 mutually interconnected by a bus line.

The operation panel 14 is for selecting a song desired to be sung by the user, and for adjusting, for example, echo, volume, tone, balance between music and voice volume, and volume of music. A remote control unit 14a is provided with the operation panel 14 so that a user can select music and perform other operations at a distance from the operation panel 14.

The serial input-output circuit (SIO) 16 is connected to the disk player device 30. The serial input-output circuit 16 is an interface circuit for transmitting information on song genre (which will be described later) of the selected song to the disk player device 30 via a serial transmission line 17. In the present embodiment an RS232C cable is used for the transmission line 17.

The modem 18 is a modulation-demodulation unit connected to a telephone line. The modem 18 is for modulating signals sent to an external device (host computer) transmitted through, and for demodulating a signal received through, a transmission path via the telephone line. An example of a signal modulated by the modem 18 would be a signal containing information on types and frequency of songs requested by users. An example of a signal demodulated by the modem 18 would be a signal containing new song data, for continuously providing the karaoke device 1 of the present embodiment with new song data, sent during the night from the host computer to the commander 10 via the telephone line. The demodulated signal would then be stored in the hard disk 20.

The hard disk 20 is a memory unit for storing song data of a plurality of karaoke songs selectable by the user to be sung. The song data for each of the plurality of karaoke songs includes music data, lyric data and song genre data. The music data is in the form according to a musical instrument digital interface (MIDI) standard.

The MIDI sound source 22 is connected to the amplifier/mixer 50 and is for storing musical sounds of various instruments. The MIDI sound source 22 is a sound source for producing music signals of various instruments based on the music data sent from the hard disk 20. The MIDI sound source 22 sends instrument music signal produced therein to the amplifier/mixer 50.

The video mixer 24 is connected to the disk player device 30 and the television monitor 56. The video mixer 24 is for superimposing lyric data sent from the hard disk 20 onto an NTSC image signal sent from the disk player device 30. The video mixer 24 tints lyrics that are displayed on the monitor television 56 in synchronization with output of the instrumental music so that the user knows which part of the music is being played.

The controller 12 is a microcomputer for controlling the entire part of the commander 10. The controller 12 performs various controls such as, when a user selects a song, retrieving the song genre data of the song data for the user's selected song to determine the song genre of the user's selected song, transmitting information on the song genre to the disk player device 30, consecutively retrieving the music data and lyric data for the selected song from the hard disk 20 according to the progress of the music of the song, and sending lyric data to the video mixer 24 and song data to the MIDI sound source 22.

Figure 3:
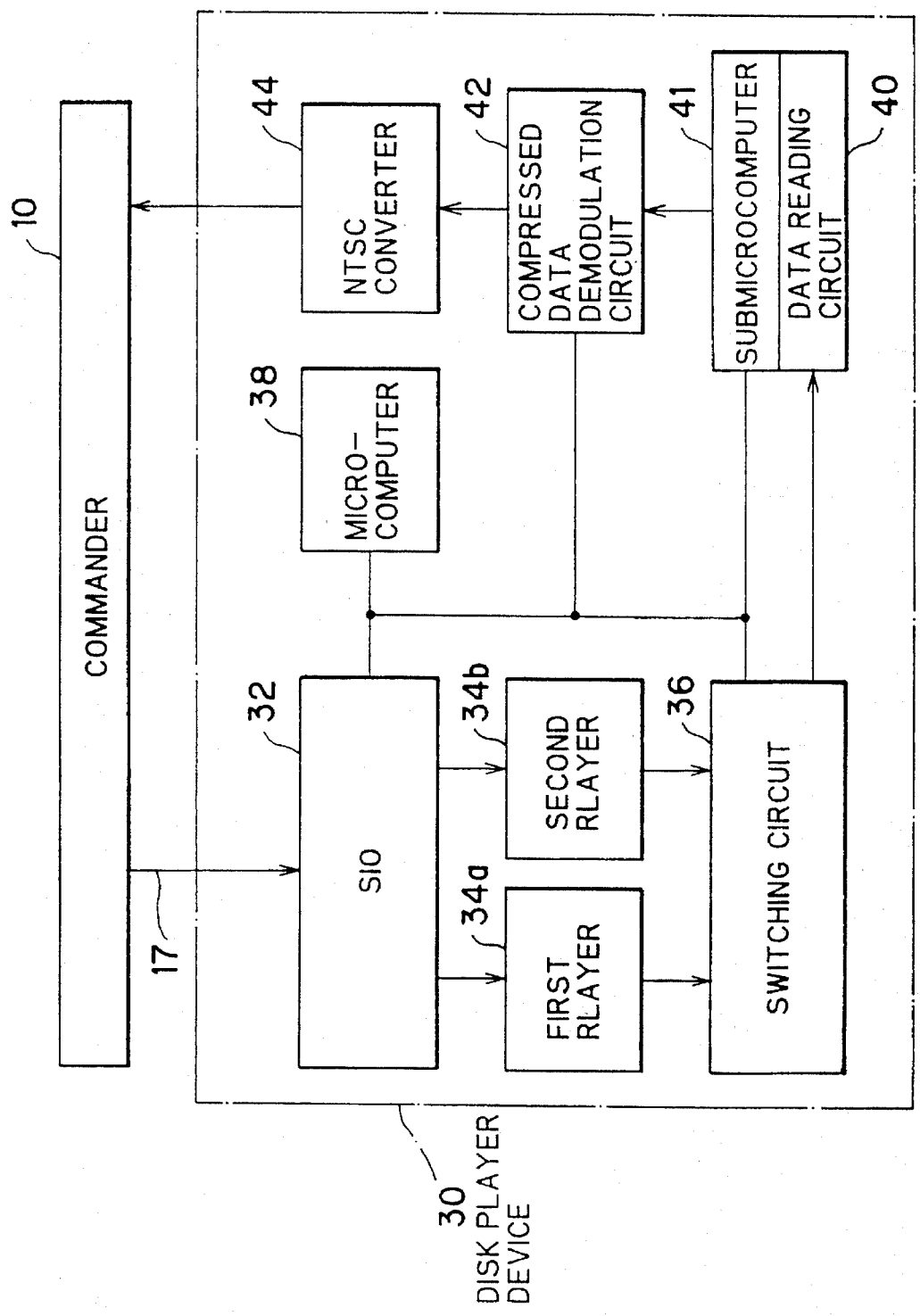
FIG. 3 is a block diagram showing a structure of a disk player device according to a first preferred embodiment of the present invention.

Next, an explanation will be provided for the disk player device 30 while referring to FIG. 3. The disk player device 30 includes a serial input/output circuit (SIO) 32, a first disk changeable player (referred to as a "first player," hereinafter) 34a, a second disk changeable player (referred to as a "second player," hereinafter) 34b, a switch circuit 36, a microcomputer 38, a data reading circuit 40, a compressed data demodulation circuit 42, and a NTSC convertor 44.

The serial input/output circuit (SIO) 32 is an interface circuit for receiving the information on the song genre of a selected song sent from the commander 10.

The first and second players 34a and 34b are both connected to the serial input/output circuit 32. The first and second players 34a and 34b are for selecting and reproducing chapters of appropriate image genre according to a random order, as will be described later. Each of the first and second players 34a and 34b includes a changer portion and a player portion (both not shown). Both the changer portion and the player portion are well known. The changer portion houses 10 image reproduction disks (not shown) and is for changing the reproduction disks according to a command from the microcomputer 38 or according to a predetermined order. The player portion is for playing an image reproduction disk changed and set on the player portion.

The image reproduction disks used in the present embodiment are video disks that are the size of a 12 mm compact disk (CD). Image data is stored in each of the image reproduction disks in compressed form according to Moving Picture Image coding Experts Group (MPEG) standards. Because the image data is in compressed form, each CD size disk contains one hour of images.

Five image genre (image genre A through E) of images are stored in each image reproduction disk of the present embodiment. Image genre A is images with content appropriate for Japanese ballads with mainly a winter theme (a common theme in Japanese ballads). Image genre B is images with content appropriate for Japanese ballads with other than winter themes. Image genre C is images with content appropriate for up-tempo popular songs. Image genre D is images with content appropriate for popular songs that are not up-tempo. Image genre E is images for general songs including images with content appropriate for song genre other than Japanese ballads or popular songs.

Further, one image group is provided for each of the image genre A through E. Each image group contains 24 separate image units, each image unit being 30 seconds long in the present invention. Each 30-second image unit will be referred to as a "chapter," hereinafter. The chapters in each image genre group are numbered –1 through –24. For example, the chapters in the image group for image genre A are numbered A-1 through A-24. The 24 different chapters in each image genre group are edited so that no particular story or plot connects the 24 different chapters.

The switching circuit 36 is a circuit connected to the first player 34a and the second player 34b for switching between transmission from the first player 34a and transmission from the second player 34b of image data in the compressed form to the data reading circuit 40.

The data reading circuit 40 includes a submicrocomputer 41 and is for reading, as digital data, the compressed image data sent from the switching circuit 36. The digital data read by the data reading circuit 40 is sent to the compressed data demodulation circuit 42. The compressed data demodulation circuit 42 is an electrical circuit for demodulating the compressed digital data sent from the data reading circuit 40 into an image signal. The image signal thus demodulated by the compressed data demodulation circuit 42 is sent to the NTSC convertor 44. The NTSC convertor 44 is an electrical circuit for converting the image signal demodulated by the compressed data demodulation circuit 42 into a commercial television signal (NTSC). The NTSC image signal converted by the NTSC convertor 44 is sent to the video mixer 24 of the commander 10.

The microcomputer 38 is for controlling overall operation of the disk player devices 30 such as executing processes for randomly reproducing image reproduction disks on the first and second player 34a and 34b.

According to the present invention, song genre is defined for each karaoke song to indicate which of the image genre A through E can correspond as a background image of the karaoke song. In the present invention, the plurality of karaoke songs, the song data of which are stored in the hard disk 20, are classified into ten types of song genre: A, B, C, D, E, AB, CD, CE, DE and CDE. In other words, each of the plurality of karaoke songs stored in the hard disk 20 is assigned to either one of the ten song genre. The five song genre A, B, C, D, and E include songs which correspond to chapters of only its respective image genre of the image genre A through E. Song genre AB includes songs that correspond to both of the image genre A and B. The three song genre CD, CE, and DE include songs that correspond to two of the image genres C, D, and E. The song genre CDE includes songs that correspond to all three of the image genres C, D, and E. It is noted that the song data of each karaoke song stored in the hard disk 20 includes the song genre data indicating the song genre of the corresponding karaoke song.

A memory area (not shown) in the microcomputer 38 of the disk player device 30 stores ten tables for the above-described ten types of song genre. Each table lists the chapter numbers (A-1, A-2, and the like) of all the chapters in the corresponding image genre group(s) and reproduction chapter numbers S. Each table therefore provides correspondence between the chapter numbers (A-1, A-2, and the like) and the reproduction chapter numbers S in regards to a corresponding one of the ten types of song genre. The reproduction chapter numbers S are integers used for randomly selecting the chapters from the image group(s) corresponding to the song genre. More specifically, as will be described later, an image reproduction process of the disk player device 30 generates random variables, and the reproduction chapter numbers S serve to select the chapters from the corresponding image genre group, in accordance with the thus generated random variables, to thereby randomly select the chapters.

For example, when the selected song is a song from song genre B, only images from image genre B can correspond to the selected song. Accordingly, as shown in FIG. 6(A), the table for song genre B lists reproduction chapter numbers S of 1 through 24 in correspondence with the chapter numbers B-1 through B-24.

When the selected song is a song from song genre AB, images from both image genre A and B can correspond to the selected song. Accordingly, as shown in FIG. 6(B), the table for the song genre AB lists reproduction chapter numbers S of 1 through 24 in correspondence with the chapter numbers A-1 through A-24 and reproduction chapter numbers S of 25 through 48 in correspondence with chapter numbers B-1 through B-24.

When the selected song is from song genre CDE, images from the three image genre C, D, and E can correspond to the selected song. Accordingly, as shown in FIG. 6(C), the table for the song genre CDE lists reproduction chapter numbers S of 1 through 24 in correspondence with the chapter numbers C-1 through C-24, reproduction chapter numbers S of 25 through 48 in correspondence with the chapter numbers D-1 through D-24, and reproduction chapter numbers S of 49 through 72 in correspondence with the chapter numbers E-1 through E-24.

To operate the image karaoke device 1, a user chooses a song he/she wants to sing by manipulating the operation panel 14 of the commander 10 or the remote controller 14a. Then, the controller 12 starts retrieving the song data for the selected song from the hard disk 20. More specifically, the controller 12 first retrieves the song genre data of the song data. The controller 12 determines the song genre of the user's selected song, based on the song genre data. The controller 12 then transmits information on the song genre through the SIO circuit 16 toward the SIO circuit 32 of the disk player device 30. Then, the controller 12 consecutively retrieves lyric data and music data of the song data, in accordance with the progress of the song. The controller 12 transfers the lyric data to the video mixer 24. The controller 12 transfers the music data to the MIDI sound source 22. The lyric data and the music data are thus retrieved and supplied to the corresponding devices, in synchronization.

In the disk player device 30, the microcomputer 38 determines the song genre of the user's selected song, based on the supplied information on the song genre. Thus, the microcomputer 38 determines at least one image genre suited to the user's selected song. Then, the microcomputer 38 controls the first and second players 34a and 34b and the switching circuit 36 so as to randomly select to reproduce chapters from the at least one image group of the determined image genre in a reproduction video disk located on each of the first and second players 34a and 34b. Thus obtained image data are transferred to the data reading circuit 40, the demodulation circuit 42 and the NTSC converter 44 where the image data are transformed into the NTSC image signals. The NTSC image signals are transferred from the NTSC converter 44 to the video mixer 24 of the commander 10. Thus, the disk player device 30 serves to reproduce image data from the image reproduction disks, produces the NTSC image signals, and transfers the NTSC image signals to the video mixer 24.

In the video mixer 24, the NTSC image signals are superimposed with the lyric data supplied from the hard disk 20, in synchronization with the music data, to produce composite image signals that are displayed on the monitor television 56. The NTSC image signals become the background scene on the monitor television 56. Thus obtained background image is of an image genre that properly matches the theme, content, and the like of the song selected by the user.

The music data supplied to the MIDI sound source 22 are transformed into analog instrumental music signals. The analog music signals are sent to the amplifier/mixer 50 where they are electrically amplified and mixed at an appropriate rate with the voice of the user who is singing the song into the microphone 54 in time with the music while referring to the lyrics. The signals with the music and voice mixed therein are outputted by the speaker 52 as a musical performance.

The image karaoke device 1 having the above-described structure operates, as will be described below, to synchronously display images and play music of the user's selected song.

First, a user selects a desired song by manipulation of the operation panel 14 of the commander 10 or the remote controller 14a. As a result, the controller 12 in the commander 10 outputs a reproduction start command, and starts retrieving the song data for the selected song from the hard disk 20. The controller 12 first retrieves the song genre data for the selected song, based on which the controller 12 determines the song genre. The controller 12 then transmits the reproduce start command and the information on the song genre to the disk player device 30. The transmitted song genre information and reproduction start command are received by the disk player device 30 and the following processes are performed.

That is, the disk player device 30 starts conducting the following control process to randomly reproduce chapters. This control process will be described below while referring to the flowcharts shown in FIGS. 4 and 5.

First, the microcomputer 38 judges whether or not the song genre information has been inputted from the commander 10, in step S100. If so (i.e., step S100 is "YES"), the program proceeds to step S110. Then, the microcomputer 38 determines, based on the song genre information, the song genre (i.e., which of the above 10 song genre) of the user's selected song, in steps S110 through S190.

Then, process for the determined song genre is implemented in either one of the processes S200 through S1100. If the program proceeds to step S190 and it is determined in S190 that the user's selected song is not a song of song genre DE, it can be determined that the song is of song genre CDE. Accordingly, the program proceeds to step S1100 where processes for song genre CDE are performed.

It is noted that ten types of processes shown in steps S200 through S1100 are provided for when songs of the ten types of song genre A, B, C, D, E, AB, CD, CE, DE, and CDE are selected, respectively. Now, as one example, an explanation will be provided, while referring to FIG. 5, for the process performed in S700 when a song with the song genre AB is selected by the user.

When the user's selected song is determined as being a song of song genre AB, the microcomputer 38 first judges whether the reproduce start command has been inputted from the commander 10, in S710. If so (i.e., "YES" in S710), a player number P is set at "0" in step S720. The player number P is for causing one of the first and second players 34a and 34b to play and can be either "0" or "1." In the preferred embodiment, when the player number P is "0," reproduction is performed by the first player 34a. When the player number is "1," reproduction is performed by the second player 34b.

After the reproduction player is thus determined in step S720, the microcomputer 38 generates a random variable R, in step S730. The microcomputer 38 then judges whether the generated random value R is an integer in a range of 1 to 48 (i.e., $1 \leq R \leq 48$), in step S740. This is determined because in the example shown in FIG. 5, only images from image genre A and image genre B can correspond to the song requested. The 24 chapters stored with chapter numbers A-1 through A-24 and the 24 chapters stored with chapter numbers B-1 through B-24 provide a total of 48 reproduction chapters as candidates for background images. If the random value R is less than 1 or greater than 48 (i.e., "NO" in step S740), it will not correspond to any of the 48 candidates so a new random value R will have to be generated. If the random value R is an integer in the range from 1 to 48 (i.e., "YES" in step S740), the random value R is changed or converted into a chapter number S for playing in step S750. In other words, the chapter number S is determined as a value equal to the random value R.

It is noted that when the selected song is from song genre CD, DE, or EC (i.e., the song corresponds to images of two image genre), step S740 should determine whether the random value R is an integer in the range of 1 through 48 (i.e., $1 \leq R \leq 48$), similarly to the above-described case where the selected song is from the song genre AB. When the selected song is from song genre A, B, C, D, or E (i.e., the song corresponds to images of only one image genre), the processes undergone in step S740 should determine whether the random value R is an integer in a range of 1 through 24 (i.e., $1 \leq R \leq 24$). When the selected song is from song genre CDE (i.e., the song corresponds to images from the three image genre C, D, and E), step S740 should determine whether the random value R is an integer in a range of 1 through 72 (i.e., $1 \leq R \leq 72$).

After when the reproduction chapter number S is thus determined as the random value R in step S750, the microcomputer 38 determines whether the other player (in this example, player number P is 1) is reproducing a disk, in step S760. If not (i.e., "NO" in step S760), the microcomputer 38 controls the player with the present player number P (0 in this example) to reproduce a chapter with its chapter number corresponding to the reproduction number S in step S770, while referring to the table of FIG. 6(B). For example, when the random variable R of 27 is generated in step S730, because the reproduction chapter number S is determined to have a value of 27, the chapter with its chapter number of B-3 is reproduced.

Next, the player is changed in step S780. That is, if the player number P is "0" at present, it is changed to "1," or if it is "1" at present, it is changed to "0." The program then returns to step S730 and processes following step S730 are repeated. It is noted that during a first run of the program, a disk (which will be referred to as a "disk 35a," hereinafter) is reproduced on the first player 34a which is the player number P=0 set in step S720. During a second run of the program, a disk (which will be referred to as a "disk 35b," hereinafter) is reproduced on the second player 34b. Thus, during a series of run of the program, the disks 35a and 35b are alternately reproduced on the corresponding players 34a and 34b.

In each run of the program, if it is judged in step S760 that the other player is playing (i.e., "YES" in step S760), the microcomputer 38 judges whether a reproduction complete command has been inputted from the commander 10, in step S790. If not (i.e, "NO" in step S790), the program returns to step S760. Then, when the other player is not playing, i.e., at the timing when the other player has finished its reproduction operation ("NO" in step S760), the presently set player is caused to perform its reproduction in step S770.

In this way, disks are played on the first player 34a and the second player 34b in alternation. When reproduction is determined as completed in step S790, reproduction at both the first and second players 34a and 34b is terminated in step S795 and this program is completed.

Figure 5:
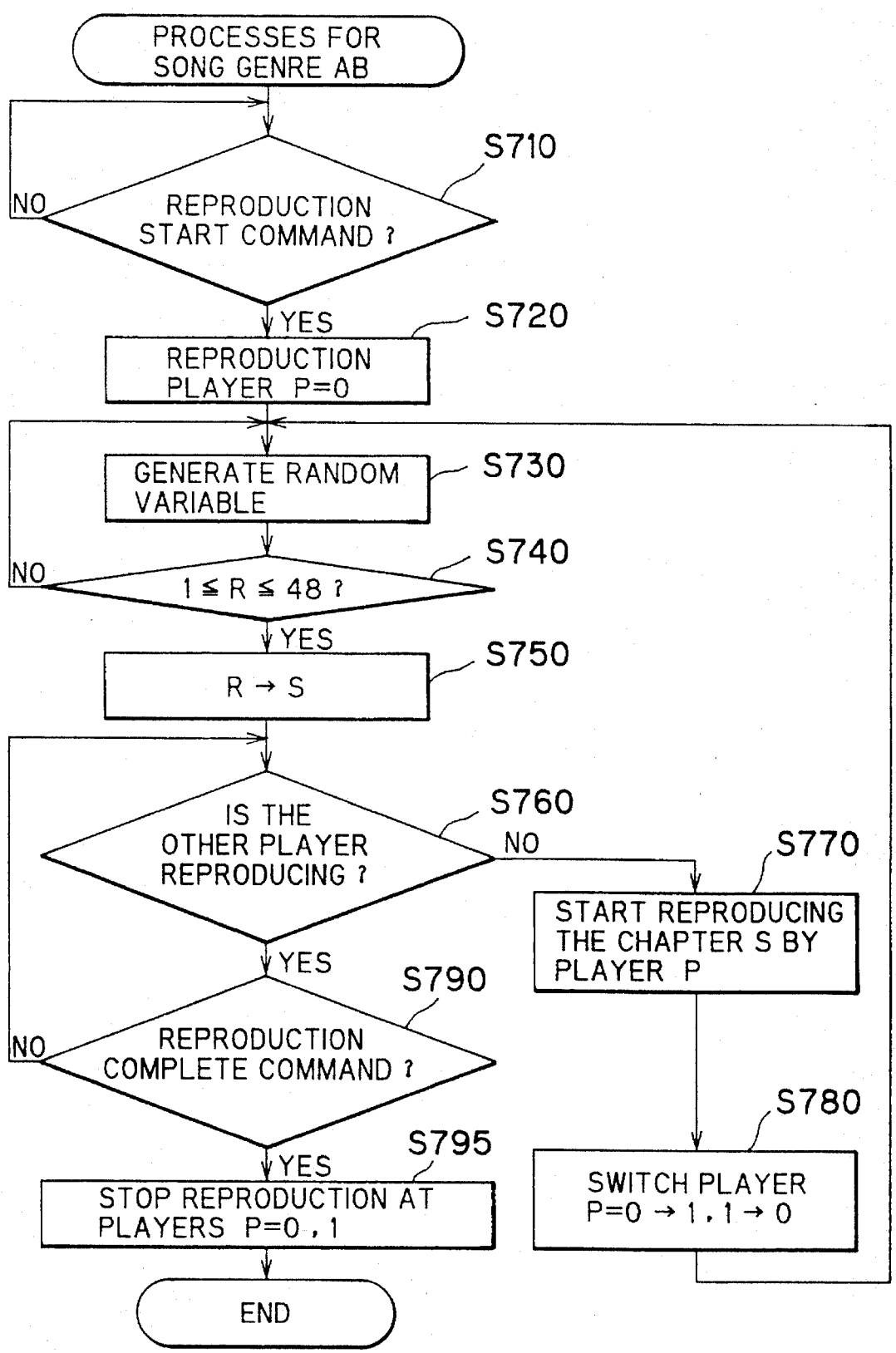
FIG. 5 is a flowchart showing process for a song genre AB implemented by a microcomputer of the disk player device.
Figure 7:
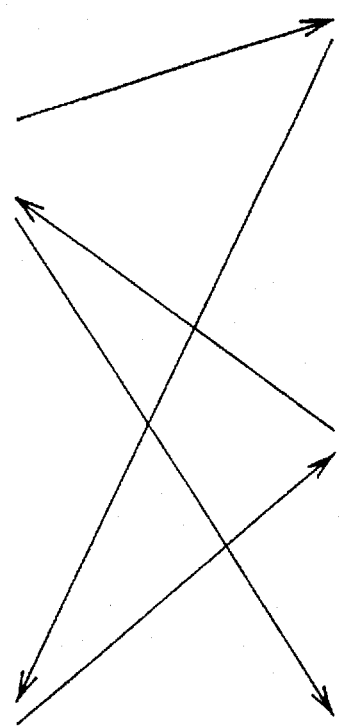
FIG. 7 is a chart showing an example of random selection of images stored in disks 35a and 35b.

By performing the processes shown in FIG. 5, chapters of image genre A and B in the image reproduction disks 35a and 35b being reproduced by the first and second players 34a and 34b are reproduced one by one in random combinations and displayed on the monitor television 56 as background images. One example for a three minute song is shown in FIG. 7. In this example, six chapters are combined into a three minute series of images. Chapter A-2 of disk 35a is started, then chapter A-1 of disk 35b, chapter B-3 of disk 35a, chapter A-24 of disk 35b, chapter A-3 of disk 35a, and chapter B-3 of disk 35b are reproduced one after the other in order.

A great many series of background images can be formed by combinations of the 30-second chapters. Even if a user requests many songs of the same song genre (in this example, song genre AB), a great many songs can be played before any one image appears at the start of two separate songs. The number of different images that can be displayed at the start portion of each song equals the number of chapters in the disk 34a and the disk 35b, that is, 96 (48×2=96) in this case. Therefore, a user will feel that there are a many more background images than are actually stored in the source of image information. For this reason, background images supplied even from a small source of image information will keep the user interested.

Further, in the present embodiment, five image genre are provided (i.e., for winter Japanese ballads, for Japanese ballads with other than winter themes, for up-tempo popular songs, for popular songs other than up-tempo songs, and for general songs), rather than merely image genre for Japanese ballads and popular songs, so that the number of image genre is increased. Accordingly, background images that are more appropriate to the content and the gist of the selected song can be obtained.

Conventionally, increasing the number of image genre, and thereby decreasing the number of images per image genre, gives the karaoke user the impression of always viewing the same images. However, in the device according to the present invention, some songs correspond to only one of the five image genre, but some songs can correspond to images of more than one image genre. Therefore, by defining songs as corresponding to a plurality of image genre, more types of background images can be selected from.

It is noted that disks need not be reproduced alternately on the first and second players as shown in FIG. 7, but can be reproduced at random. For example, even if the same image reproduction disk is used, if chapters are provided in sequence, then they can be played consecutively.

In the present embodiment, disks are reproduced on a two system image supply source constructed from the first and second players 34a and 34b. However, three or more image supply sources (players, and the like) can be used. Reproduction images can be read at random on these and displayed.

An image karaoke device of a second embodiment of the present invention will be described below.

In the second embodiment, as shown in FIG. 1, the image karaoke device is constructed to have a plurality of sets of the image information memory unit M3 and the image information reading unit M4. According to the present embodiment, the image reading control unit M6 serially but randomly controls the plurality of image information reading unit M4 to read the image units from the corresponding image information memory unit M3.

In more concrete terms, in the above-described first embodiment, in order to randomly select the chapters (image units), the first and second players 34a and 34b are driven in alternation, while randomly selecting the chapters (image units) from each of the video disks 35a and 35b to be reproduced by the corresponding disk players 34a and 34b. However, according to the present embodiment, providing a plurality of disk players each being ready for reproducing a corresponding video disk and randomly selecting the disk players to cause them to reproduce the corresponding video disk one after another can also result in random selection of the chapters. In other words, the present embodiment randomly selects a plurality of reproduction video disks to thereby randomly select the chapters. The present embodiment proposes such a random selection of the plurality of disks.

An image karaoke device of the second embodiment will be described in greater detail below, with reference to FIGS. 8 through 10 wherein parts and components the same or similar to those of the first embodiment are designated by the same or similar numerals.

Figure 8:
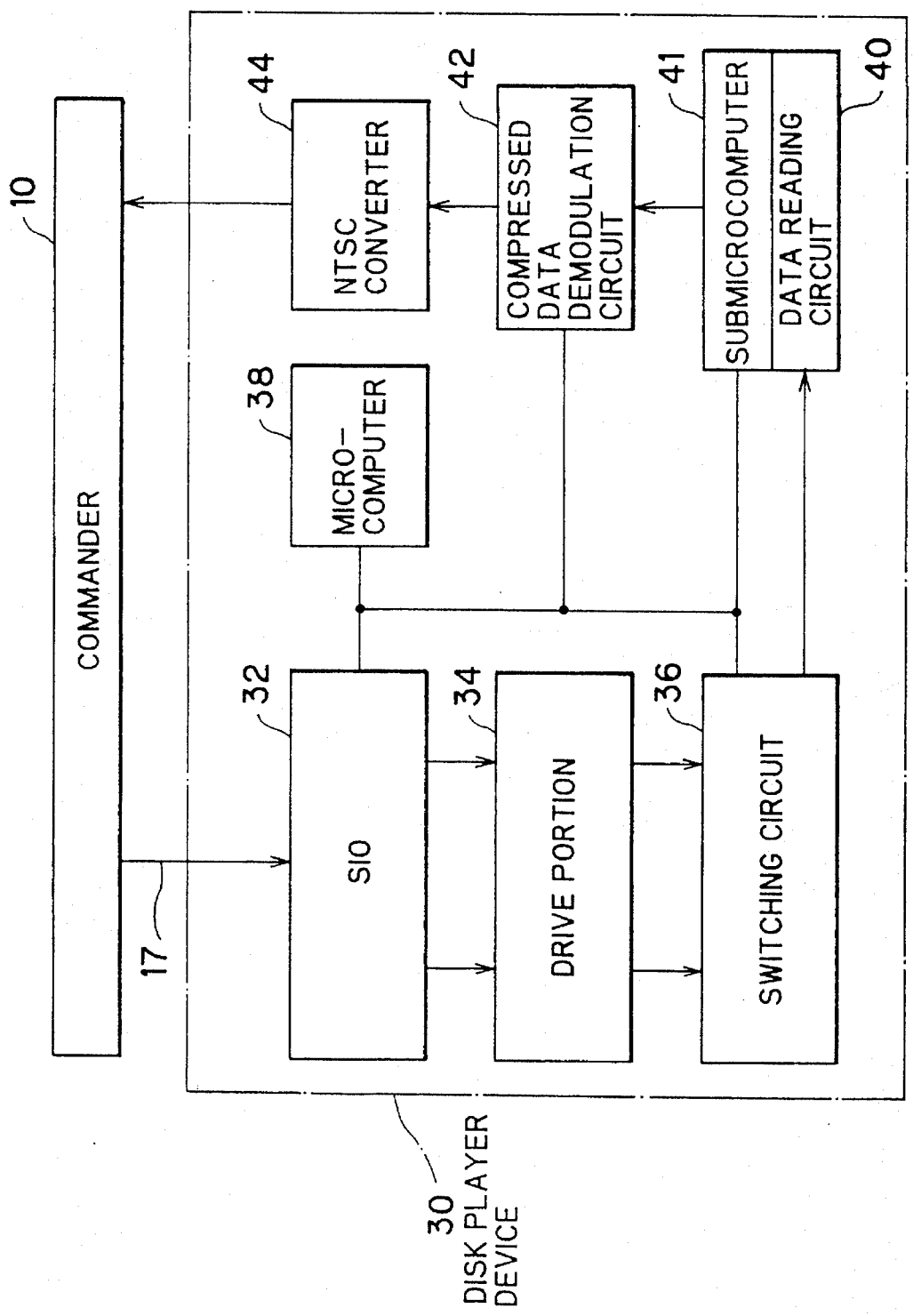
FIG. 8 is a block diagram showing a structure of a disk player device according to a second preferred embodiment of the present invention.
Figure 9:
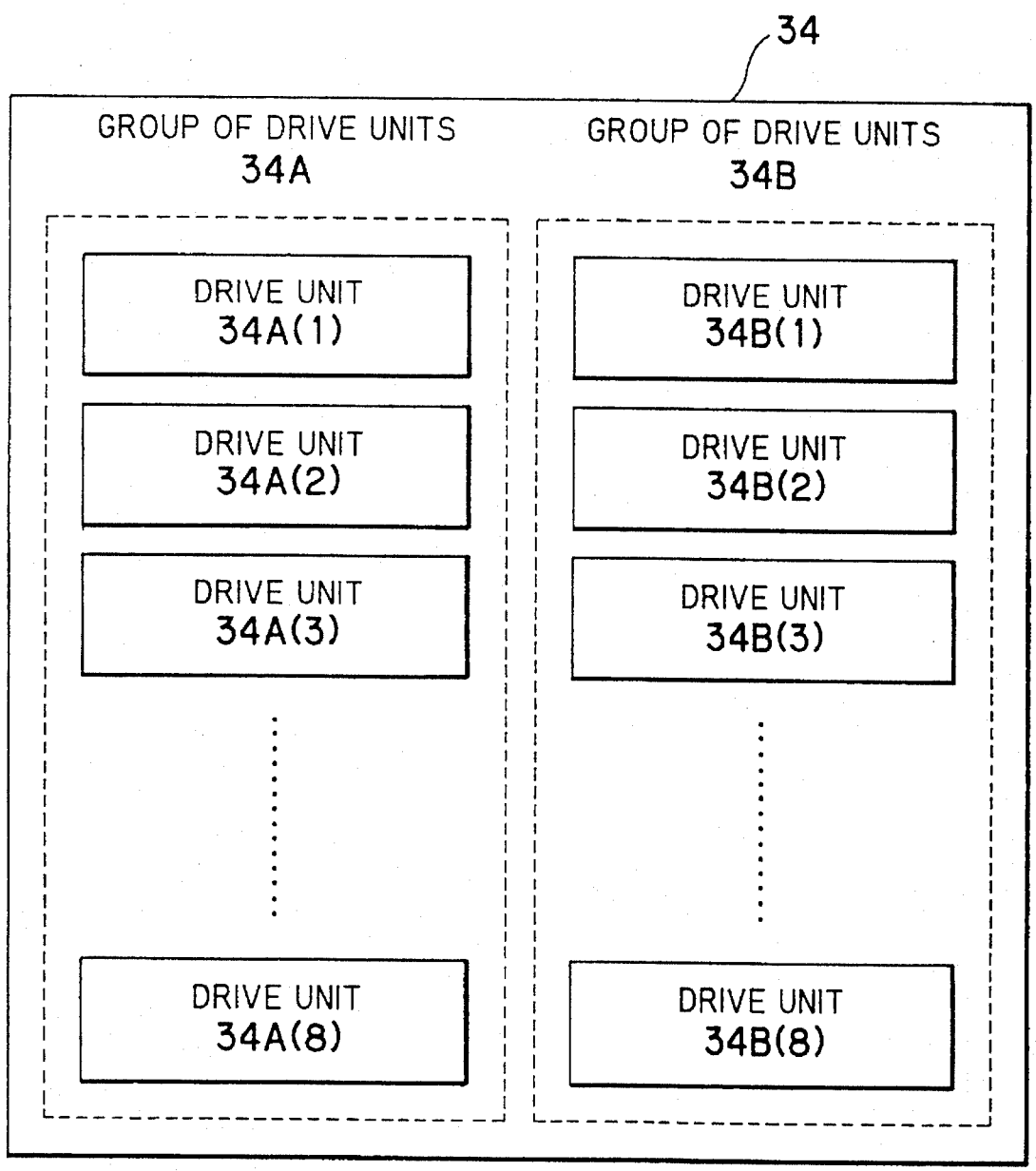
FIG. 9 is a block diagram showing a structure of a drive portion 34 of the disk player device of FIG. 8.

The structure of the image karaoke device of the present embodiment is the same as that of the first embodiment shown in FIGS. 2 and 3, except that the first and second disk players 34a and 34b in the disk player device 30 of the first embodiment are replaced with drive portion 34, as shown in FIGS. 8 and 9.

As shown in FIG. 9, the drive portion 34 includes two groups of drive units 34A and 34B. The drive unit group 34A has eight drive units 34A(1) through 34A(8), and the drive unit group 34B has eight drive units 34B(1) through 34B(8). Each of the drive units 34A(1)–34A(8) and 34B(1)–34B(8) is a player, on which is located a single video disk. In this embodiment, the switching control circuit 36 is connected to both the first and second drive unit groups 34A and 34B for switching between transmission from the first drive unit group 34A and transmission from the second drive unit group 34B of video signals (compressed digital data) to the data reading circuit 40.

In the first embodiment, ten tables described with reference to FIG. 6 are stored in the memory area of the microcomputer 38 for the ten types of song genre. Contrarily, in the present embodiment, the memory area of the microcomputer 38 stores therein a table for each of all the chapters of each of the 16 disks provided on the 16 drive units 34A(1)–34A(8) and 34B(1)–34B(8). In other words, if each disk has 120 chapters, the microcomputer stores 1920 tables. The microcomputer 38 controls each table to indicate whether or not the corresponding chapter has been selected during previous runs of the program. It is noted that the tables for each disk are cleared to be reset when all the chapters of the each disk have been selected. As will be described later, the present embodiment randomly selects chapters out of those of a song genre group of the selected song which have not yet been selected during the previous runs of the program.

The image karaoke device of the present embodiment operates, as will be described below with reference to FIG. 10.

Similarly to the first embodiment, to operate the image karaoke device of the present embodiment, an user chooses a desired song by manipulating the operation panel 14 or the remote controller 14a. When the desired song is thus selected, the controller 12 retrieves from the hard disk 20 the song genre data for the selected song, and determines the song genre of the selected song. The controller 12 then transmits the information on the song genre to the disk player device 30 together with the reproduction start command. The controller 12 also retrieves from the hard disk 20 the lyric data and the music data of the selected song, in synchronization.

Figure 4:
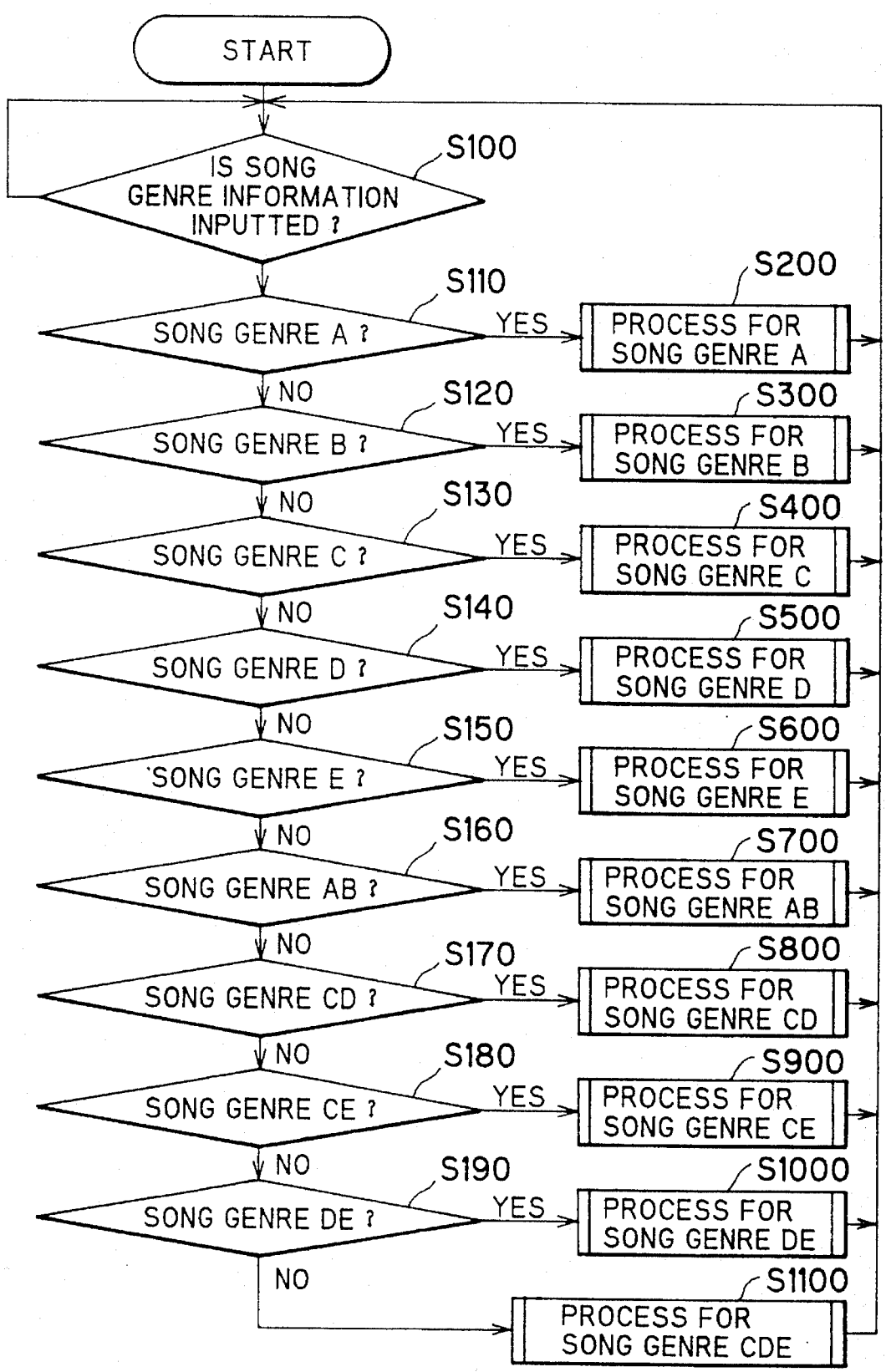
FIG. 4 is a flowchart showing processes implemented by a microcomputer of the disk player device shown in FIG. 3.

Receiving the song genre information, the disk player device 30 first performs the control processes shown in FIG. 4, to thereby determine which one of the processes 200 through 1100 should be conducted for the selected song. Each of the processes 200 through 1100 has the procedures shown in FIG. 10, according to the present embodiment.

Figure 10:
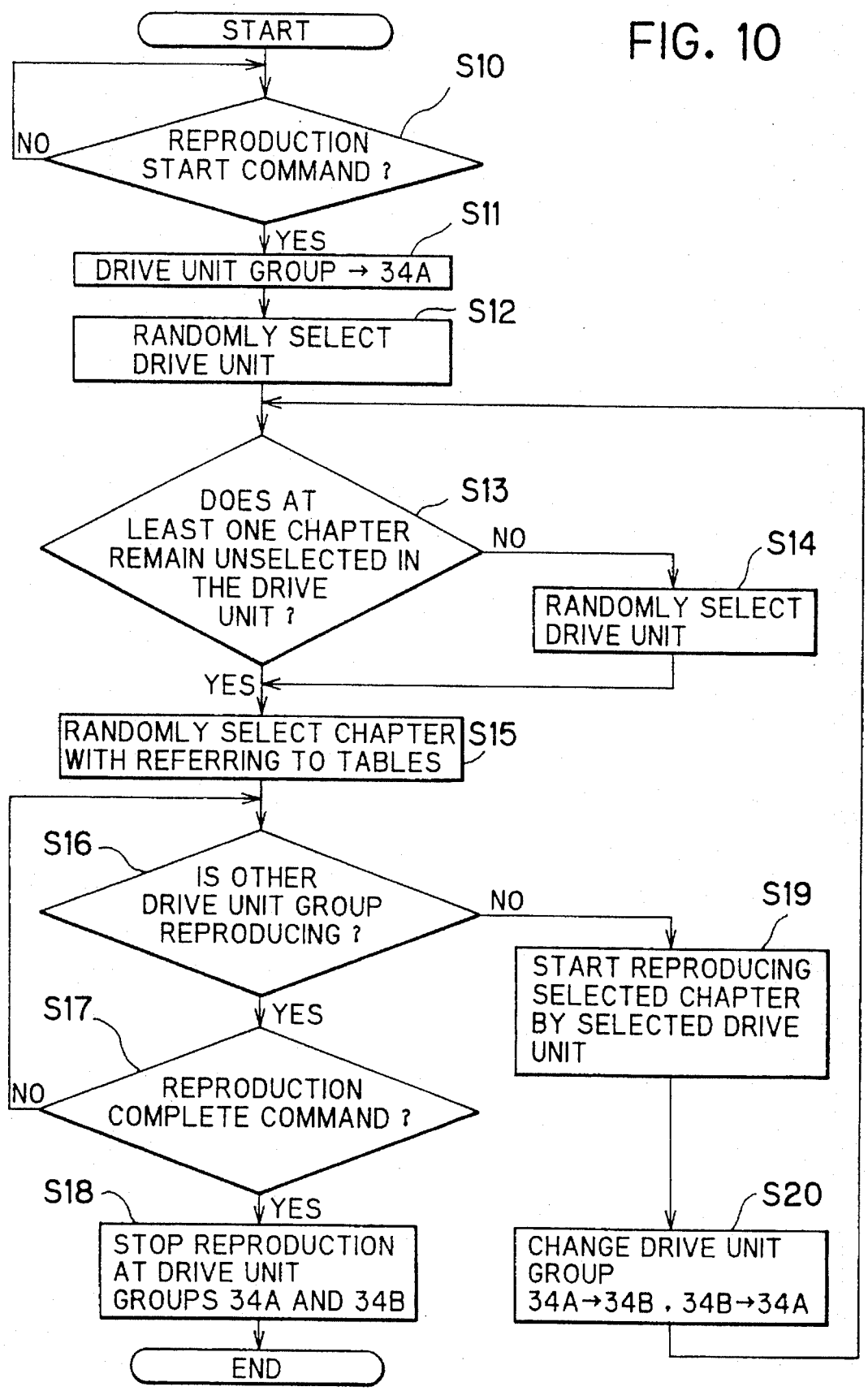
FIG. 10 is a flowchart showing process implemented by a microcomputer of the disk player device of FIG. 8.

As shown in FIG. 10, the microcomputer 38 first judges in step S10 whether the reproduction start command has been inputted to the disk player device 30. When the reproduction start command has been inputted (i.e., "Yes", in step S10), the first drive unit group 34A is initially set, in step S11. Then, one reproduction drive unit is randomly selected out from the eight reproduction drive units 34A(1) through 34A(8) of the first drive unit group 34A, in step S12. It is noted that in order to randomly select one of the drive units, steps similar to the steps S730 through S750 of FIG. 5 may be achieved in the step S12. More specifically, a random value R is generated. Then, when the random value R is in the range of 1 to 8, one of the disk drive units 34A(1) through 34A(8) is selected in correspondence with the random value R.

Then, in step S13, the microcomputer 38 judges whether or not at least one chapter remains unselected in the song genre of the disk located on the selected drive unit, by referring to the tables corresponding to the selected drive unit. More specifically, the microcomputer 38 refers to the tables of all the chapters of the selected song genre, to thereby perform the judgement. If all the chapters have been selected out of the song genre (i.e., "No" in step S13), the process goes to step S14 where one reproduction drive unit is again randomly selected out from the eight reproduction drive units 34A(1) through 34A(8) in the same manner as in step S12. If at least one chapter remains unselected in the song genre of the selected song (i.e., "Yes" in step S13), one chapter is randomly selected out from the unselected remaining chapters, in step S15, while referring to the tables. It is noted that during a first run of the program, because unselected chapters exist, step S13 directly proceeds to step S15 where one of the unselected chapters is randomly selected. In order to randomly select one of the unselected chapters in step S15, steps similar to the steps S730 through S750 of FIG. 5 may be achieved in the step S15. More specifically, the microcomputer first counts the number of the unselected chapters, By referring to the tables. Then, the unselected chapters are arranged in a predetermined order. The microcomputer generates a random value R (integer $\geq 1$). When the generated random value is equal to or lower than the number of the unselected chapters, the microcomputer determines one of the unselected chapters, in accordance with the random value R.

After when one chapter is randomly selected in step S15, step S16 judges whether or not any of the drive units constituting the other drive unit group (during this first run, the second drive unit group 34B) is reproducing a disk. If any of the drive units of the other drive unit group is not reproducing (i.e., "No" in step S16), process goes to step S19 where the selected drive unit is caused to reproduce the selected chapter.

Then, in step S20, the drive unit group is changed. Because the first drive unit group 34A is set for the first run of program, step S20 newly sets the second drive unit group 34B for the second run of program. Then, process goes back to step S13.

Then, in step S13, the microcomputer 38 judges whether or not at least one chapter remains unselected in the song genre of the disk located on the selected drive unit of the newly set second drive unit group 34B, by referring to the tables corresponding to the selected drive unit. If all the chapters have been selected out of the song genre (i.e., "No" in step S13), the process goes to step S14 where one reproduction drive unit is again randomly selected out from the eight reproduction drive units 34B(1) through 34B(8) in the same manner as in step S12. If at least one chapter remains unselected in the song genre of the selected song (i.e., "Yes" in step S13), one chapter is randomly selected out from the unselected remaining chapters, in step S15, while referring to the tables.

After when one chapter is randomly selected in step S15, step S16 judges whether or not any of the drive units constituting the other drive unit group (during this second run, the first drive unit group 34A) is reproducing a disk.

If any of the drive units of the other drive unit group is not reproducing (i.e., "No" in step S16), process goes to step S19 where the selected drive unit is caused to reproduce the selected chapter. Then, in step S20, the drive unit group is changed. Because the second drive unit group 34B is now set for the second run of program, step S20 newly sets the first drive unit group 34A for the third run of program. Then, process goes back to step S13.

On the other hand, if one drive unit in the other drive unit group is now reproducing (i.e., "Yes" in step S16), the microcomputer 38 judges whether or not a reproduction complete command has been inputted from the commander 10 in step S17. If the complete command has been inputted, (i.e., "Yes", in step S17), step S18 stops driving both the drive unit groups 34A and 34B.

In this way, the drive unit groups 34A and 34B are driven in alternation. In each drive unit group, the drive units are randomly selected to reproduce the corresponding disks. In addition, each of the randomly selected drive units randomly selects the chapters out of the corresponding disk. The chapters are reproduced to be sequentially combined into a series of image to be displayed by the monitor television 56 as a background image.

According to the present embodiment, thus randomly selecting the drive units performs to randomly select the video disks to be reproduced, resulting in randomly selecting chapters out of the video disks and combining them into a series of images. These combinations of the randomly selected chapters can provide large variety in the series of background images, similarly to the first embodiment.

In the above description, the two reproduction drive unit groups 34A and 34B are provided. However, three or more reproduction drive unit groups may be provided. In this case, the three or more reproduction drive unit groups may be selected alternately. However, the drive unit groups may preferably be selected randomly one after another from the three or more reproduction drive unit groups. Thus randomly selecting the drive unit groups can provide a larger variety in the reproduced series of background images than selecting the drive unit groups in the predetermined order.

It is further noted that simply providing a single drive unit group can provide sufficiently large variety in the obtainable series of background images. Even if only the first drive unit group 34A is provided, randomly selecting the drive units 34A(1) through 34A(8) one after another can provide the large variety in the sequence of the chapters.

The memory area of the microcomputer 38 may further store a table indicating whether or not each of the drive units 34A(1) through 34A(8) and 34B(1) through 34B(8) has been selected in steps S12 and S14 during previous runs of the program. Then, steps S12 and S14 may be controlled to select the drive units from the drive units that have not yet been selected in the previous run of the program. Thus selecting drive units from the unselected drive units may provide a larger variety in the background images.

It is noted that in steps S12 and S14, the drive units may be selected in a predetermined order from each drive unit group. In this case, however, a combination of the drive units selected first for each song from the two drive unit groups 34A and 34B should be differentiated from the combination of the drive units first selected for the latest played song. For example, assume that the drive units are selected from the first group 34A in a predetermined order that the drive units 34A(1), 34A(2), 34A(3), ..., and 34A(8) may be selected in this order, and that the drive units are selected from the second group 34B in a predetermined order that the drive units 34B(1), 34B(2), 34B(3), ..., and 34B(8) may be selected in this order. Further assume that a combination of the drive units 34A(1) and 34B(1) is first selected, for one selected song. For this song, combinations of the drive units 34A(2) and 34B(2) and 34A(3) and 34B(3) are successively selected, and a combination of the drive units 34A(4) and 34B(4) is lastly selected. In this case, for the next selected song, such a combination of the drive units 34A(5) and 34B(5) should not be first selected, but other types of combination such as the combination of the drive units 34A(5) and 34B(6), the drive units 34A(7) and 34B(5), etc. should be selected. Thus, changing the combination of the drive units to be selected first for each song can provide a large variety in the obtainable series of images.

Figure 11:
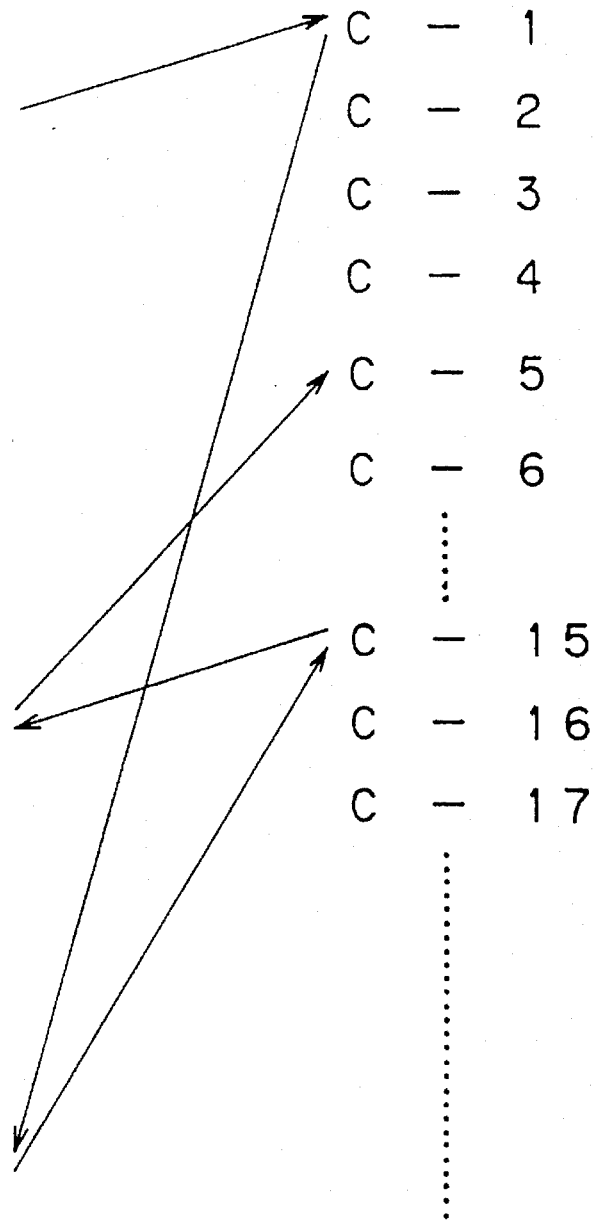
FIG. 11 is a chart showing an example of random selection of images stored in disks 35a and 35b according to the third embodiment of the present invention.

A third embodiment of the present invention will now be described below with reference to FIG. 11.

The present embodiment classifies images into a plurality of categories. More specifically, the plurality of image units stored in the image information memory unit M3 in the image karaoke device of FIG. 1 are classified into the plurality of categories. In this embodiment, the image reading control unit M6 controls the image reading unit M4 to read out the image units of the plurality of categories from the memory unit M3 so that two or more image units of the same category may not be consecutively read out. Because each image unit has a 30 seconds long, for example, the same category of images may not be continuously displayed for more than 30 seconds. Accordingly, the user will not bore the series of background images.

Especially, in the case where the image information memory unit M3 stores the plurality of image genre groups, the plurality of image units constituting each image genre group are preferably classified into the plurality of categories. When the image reading control unit M6 controls the image reading unit M4 to randomly read out several image units one after another from the at least one image genre group corresponding to the song genre of the selected karaoke song, the image reading control unit M6 may control the image reading unit M4 to read out the several image units of the plurality of categories so that the image units of the same category may not be consecutively read out.

Contents of the image units are not related by any particular story or plot. However, showing two or more image units of the same category in succession may possibly mislead a viewer to believe that some sort of connecting plot exists between the two or more image units contrary to their contents, which therefore may give the viewer a strange impression. Contrarily, showing two or more image units of the different categories in succession may not mislead a viewer to believe that any sort of connecting plot exists between the two or more image units. Accordingly, in order not to give the viewer the strange impression, the present embodiment controls not to consecutively read out the image units of the same category.

For example, the present embodiment classifies images into two categories: a first category α of images where one or more people are shown; and a second category β of images where scenery are shown.

The structure of the image karaoke device of the present embodiment is the same as that of the first embodiment shown in FIGS. 2, 3 and 6. According to the present embodiment, the video disks are prepared into two groups of video disks: first group of video disks, each of which stores the 120 chapters (i.e., 24 chapters for each of the five image genre groups) which are all directed to the first category α; and second group of video disks, each of which stores the 120 chapters (i.e., 24 chapters for each of the five image genre groups) which are all directed to the second category β.

The ten video disks housed in the changer portion of each of the first and second players 34a and 34b have five video disks of the first group and five video disks of the second group. In the present embodiment, the first player 34a is controlled by the microcomputer 38 so that its changer portion may select one of the five video disks of the first group to locate it on its player portion. The second player 34b is controlled by the microcomputer 38 so that its changer portion may select one of the five video disks of the second group to locate it on its player portion. Accordingly, the first player 34a always reproduces chapters of the first category α which display images of one or more people. The second player 34b always reproduces chapters of the second category β which display images of scenery.

The image karaoke device of the present embodiment achieves control processes the same as those of FIGS. 4 and 5. The disk players 34a and 34b are therefore alternately driven to randomly select the chapters from the video disks located on the disk players. Accordingly, the chapters of the first and second categories α and β are alternately selected to be displayed on the monitor television 56. Assume now that a disk 35a of the first category α and a disk 35b of the second category β are located on the disk players 34a and 34b, respectively, and that the selected song is of the song genre C. In this case, for example, as shown in FIG. 11, Chapter C-2 of disk 35a, Chapter C-1 of disk 35b, Chapter C-20 of disk 35a, Chapter C-15 of disk 35b, Chapter C-16 of disk 35a, Chapter C-5 of disk 35b are reproduced one after the other in this order. Accordingly, images of peoples and the images of scenery are alternately reproduced to be displayed. Because each chapter has only 30 seconds long, each category of image is not displayed for more than 30 seconds, and an user will not tire of the series of same category images. Thus alternately combining the two category of images can provide large variety in the series of background images.

In the present embodiment, as described above, the chapters of people are not reproduced in succession. Similarly, the chapters of scenery are not reproduced in succession. In the present invention, as described already, the contents of the chapters are not related by any particular story or plot. Showing two or more chapters of people images (or two or more chapters of scenery image) in succession can possibly mislead a viewer to believe that some sort of connecting plot exists between the two or more images contrary to their contents, resulting in giving the viewer a strange impression. The present embodiment, however, prevents the chapters of the same category from being successively reproduced in order not to give such the strange impression to the viewer.

In the above description, the two players 34a and 34b are provided for reproducing the first and second category of images, respectively. However, three or more players may be provided for reproducing three or more category of images, respectively. In this case, the three or more players should be controlled so that the same player may not be consecutively driven. The three or more players may preferably be controlled to reproduce the three or more category images, in alternation.

In the above-description, each video disk contains each category of image chapters. However, the two category of chapters are both stored in each video disk. In this case, 12 chapters of category α and 12 chapters of category β are stored for each of the five image genre groups. In such a case, the first and second category of chapters should be assigned to different reproduction chapter numbers S. In order to alternately and randomly select the chapters from the first and second category of chapter groups, the step S740 in the process of FIG. 5 may alternately determine the range for limiting the random value R between two different ranges. In more concrete terms, when the first and second category of chapters are assigned to the reproduction chapter numbers S of 1 through 12 and 13 through 24, respectively, the range $1 \leq R \leq 12$ should be determined for selecting the chapter from the first category α, and the range $13 \leq R \leq 24$ should be determined for selecting the chapter from the second category β. The ranges $1 \leq R \leq 12$ and $13 \leq R \leq 24$ are alternated in the successive series of runs of the program of FIG. 5.

As described above, according to the karaoke device of the present invention, the total time of image information stored in the image information source is short. Therefore, the device can be housed in a compact space. Regardless of this, the device can supply a large variety of background images so that the karaoke user will not tire of the images.

Especially, in the above-described embodiments, five image genre are provided (i.e., for winter Japanese ballads, for Japanese ballads with other than winter themes, for up-tempo popular songs, for popular songs other than up-tempo songs, and for general songs), rather than merely image genre for Japanese ballads and popular songs, so that the number of image genre is increased. Accordingly, background images that are more appropriate to the content and the gist of the selected song can be obtained.

Additionally, according to the above-described embodiments, at least two players 34a and 34b or at least two player groups 34A and 34B are provided. Accordingly, switching the two or more players or player groups with the switching circuit 36 can immediately cause the chapters from the two or more players or player groups to be switched to be displayed. It is therefore possible to continuously display the chapters without any break between the chapters.

While the invention has been described in detail with reference to specific embodiments thereof, it would be apparent to those skilled in the art that various changes and modifications may be made therein without departing from the spirit of the invention.

For example, in the above-described embodiments, images are classified into five image genre. However, images may be classified into other various number of image genre. Furthermore, in the above description, the five image genre are determined appropriate for winter Japanese ballads, Japanese ballads with other than winter themes, up-tempo popular songs, popular songs other than up-tempo songs, and general songs. However, the image genre may be determined appropriate for other kinds of songs.

In the above-described embodiments, when a karaoke user selects a song by operating the operation panel 14 or the remote control 14a, the controller 12 in the commander 10 determines the song genre of the song, based on the song genre data. Then, the controller 12 transmits the information on the song genre to the disk player device 30. However, the controller 12 can be provided to simply transmit the song genre data to the disk player device 30 and the microcomputer 38 in the disk player device 30 may determine the song genre, based on the song genre data.

Additionally, in the above-described embodiments, the song data for each karaoke song stored in the hard disk 20 contains the song genre data. Instead, the hard disk 20 may simply store a table listing a song number indicating each karaoke song and a song genre of the corresponding karaoke song. In this case, the controller 12 may refer to the table and determine the song genre of the user's selected song. It is noted that in this case, when a new song data is inputted to the hard disk 20 from the telephone line, a new table listing the song number and the song genre of the new song is also inputted into the hard disk 20.

The above-described embodiments employ the video disks of CD sizes in which data are stored in compressed form and therefore which can store one hour of images in total with a small size. Accordingly, the disk player device 30 storing the plurality of CD disks can be made compact. However, the image karaoke device of the present invention can employ general types of video disks.

The above-described embodiments are all directed to an image karaoke device. However, the present invention may not be limited to the image karaoke device. The present invention may be applicable to various types of devices for displaying a series of images. For example, the present invention is suitable to a device for displaying a background video image simultaneously with playing a background music.

The third embodiment describes the first category α of the image of people and the second category β of the image of scenery, as the examples of the image categories. However, the image categories are not limited to those image categories α and β. Various types of different categories may be defined. It is necessary, however, that images of different categories should not mislead a viewer to believe that any sort of connecting plot exists between the images even if the images are displayed in succession.

What is claimed is:

1. An image karaoke device for reproducing music of a song desired to be sung and for displaying an image in synchronization with the music, the image karaoke device comprising:

music information storing means for storing information on music of a plurality of songs;

song selecting means for selecting a song desired to be sung from the plurality of songs, the music information of which are stored in the music information storing means;

music reproducing means for reproducing music of the song selected by the song selection means based on the information stored in the music information storing means;

image storing means for storing a plurality of image unit groups corresponding to a plurality of image genres representative of a plurality of image contents, each image unit group being constructed from a plurality of image units with their image contents being of the corresponding image genre;

song genre determining means for determining a song genre of the song selected by the song selecting means, the song genre indicating at least one of the plurality of image genres appropriate for the song;

random selecting means for randomly selecting several image units one after another from at least one image unit group of the at least one image genre indicated by the determined song genre, to thereby produce a series of image units; and displaying means for displaying the series of image units, in synchronization with the music reproduced by the music reproducing means.

2. An image karaoke device of claim 1, wherein the plurality of image units constructing each image unit group are classified into several image categories representative of image genres, and wherein the random selecting means randomly selects the image units from the at least one image unit group of the at least one image genre indicated by the determined song genre, while preventing the image units of the same image category from being consecutively selected from the image storing means.

3. An image karaoke device of claim 2, wherein the image storing means includes a single video disk for storing the plurality of image unit groups, and wherein the random selecting means randomly selects the several image units one after another from the single video disk, while preventing the image units of the same image category from being consecutively selected.

4. An image karaoke device of claim 2, wherein the image storing means includes at least two video disks each for storing a plurality of image units, wherein the random selecting means includes at least two disk players each for selecting and reproducing image units stored in a corresponding video disks, and wherein the random selecting means further includes alternation control means for controlling the at least two disk players to randomly select and reproduce the image units from the corresponding video disks, in alternation, while preventing the image units of the same image category from being consecutively selected, to thereby cause the displaying means to consecutively display the image units from the at least two video disks.

5. An image karaoke device of claim 2, wherein the image storing means includes a plurality of video disks each for storing a plurality of image units of a corresponding image category, and wherein the random selecting means includes:

disk random selecting means for randomly selecting several video disks one after another from the plurality of video disks;

disk playing portion for selecting and reproducing an image unit of the at least one image genre indicated by the determined song genre from the plurality of image units stored in each of the randomly selected video disks to thereby successively reproduce the image units from the randomly selected video disks; and disk selection control means for preventing the disk random selecting means from consecutively selecting the video disks storing the same image category from the plurality of video disks.

6. An image karaoke device of claim 2, wherein the image storing means includes a plurality of video disks each for storing a plurality of image units of the plurality of image categories, and wherein the random selecting means includes:

disk random selecting means for randomly selecting several video disks one after another from the plurality of video disks;

disk playing portion for selecting and reproducing an image unit of the at least one image genre indicated by the determined song genre from the plurality of image units stored in each of the randomly selected video disks to thereby successively reproduce the image units from the randomly selected video disks; and image unit selection control means for preventing the disk playing portion from consecutively selecting the image units of the same image category from the each of the randomly selected video disks.

7. An image karaoke device of claim 2, wherein the image storing means includes a plurality of video disks each for storing a plurality of image units of the plurality of image categories, and wherein the random selecting means includes:

a plurality of disk players each for selecting and reproducing image units of the at least one image genre indicated by the determined song genre from a corresponding one of the plurality of video disks;

disk player random selecting means for randomly selecting the disk players one after another from the plurality of disk players to cause the randomly selected disk players to consecutively reproduce the image units; and disk player selection control means for preventing the consecutively selected disk players from selecting the image units of the same image category from the corresponding video disks.

8. An image karaoke device of claim 1, wherein the music information storing means further stores information on lyrics of the plurality of songs, and wherein the displaying means includes:

a composite image producing means for composing the lyrics of the song selected by the song selecting means and the series of image units to thereby produce a series of composite images; and a composite image displaying means for displaying the series of composite images in synchronization with the music reproduced by the music reproducing means.

9. An image karaoke device of claim 1, wherein the image storing means includes a single video disk for storing a plurality of image unit groups of the plurality of image genres, and wherein the random selecting means randomly selects the several image units one after another from the corresponding image unit group stored in the single video disk.

10. An image karaoke device of claim 1, wherein the image storing means includes at least two video disks each for storing a plurality of image units, wherein the random selecting means includes:

at least two disk players each for selecting and reproducing image units stored in a corresponding one of the at least two video disks; and alternation control means for controlling the at least two disk players to randomly select and reproduce the image units from the at least one image unit group of the at least one image genre indicated by the determined song genre in the corresponding video disks, in alternation, to thereby cause the displaying means to consecutively display the image units from the at least two video disks.

11. An image karaoke device of claim 1, wherein the image storing means includes a plurality of video disks each for storing a plurality of image units of the plurality of image genres, and wherein the random selecting means includes:

disk random selecting means for randomly selecting the video disks one after another from the plurality of video disks;

disk playing portion for selecting and reproducing an image unit from the plurality of image units stored in each of the randomly selected video disks to thereby successively reproduce the image units from the randomly selected video disks; and image unit selection control means for controlling the disk playing portion to select, from each of the randomly selected disks, an image unit of the at least one image genre indicated by the determined song genre stored in the corresponding video disk.

12. An image karaoke device of claim 1, wherein the image storing means includes a plurality of video disks each for storing a plurality of image units of the plurality of image genres, and wherein the random selecting means includes:

a plurality of disk players each for selecting and reproducing image units from a corresponding video disk;

disk player random selecting means for randomly selecting the disk players one after another from the plurality of disk players to cause the randomly selected disk players to successively reproduce the image units stored in the corresponding video disks; and image unit selection means for controlling each of the randomly selected plurality of disk players to select an image unit the corresponding second image unit group of each of at least one of the at least one image genre indicated by the determined song genre stored in the corresponding video disk.

13. An image karaoke device of claim 1 wherein the music information storing means further stores information on a song genre of each of the plurality of songs, the song genre indicating at least one image genre appropriate for the corresponding song, the song genre determining means determining a song genre of the selected song based on the information stored in the music information storing means.

14. An image karaoke device of claim 13, wherein the music information storing means stores a plurality of sets of song data for the plurality of songs, each set of song data including song genre data indicative of song genre of the corresponding song, and wherein the song genre determining means includes song genre detection means for detecting the song genre data of the selected song to determine a song genre of the selected song.

15. An image karaoke device of claim 1, wherein the random selecting means includes:

a song genre table for each song genre, the song genre table listing successive numbers in correspondence with the plurality of image units constructing at least one image unit group of corresponding at least one image genre;

random number range determination means for determining a range of random numbers constructed form the successive numbers listed for the determined song genre;

random number generating means for successively generating random numbers from the determined random number range; and image unit selecting means for successively selecting image units of the at least one image genre indicated by the determined song genre, based on the generated random numbers and the song genre table for the determined song genre.

16. An image karaoke device of claim 1, wherein the image storing means includes a plurality of video disks each for storing a plurality of image units of the plurality of image genres, and wherein the random selecting means includes:

disk random selecting means for randomly selecting several video disks one after another from the plurality of video disks; and disk playing portion for selecting and reproducing an image unit, of the at least one image genre indicated by the determined song genre, stored in each of the randomly selected video disks to thereby successively reproduce the image units from the randomly selected video disks.

17. An image karaoke device for reproducing music of a song desired to be sung and for displaying an image in synchronization with the music, the image karaoke device comprising:

music information storing means for storing information on music of a plurality of songs, the music information storing means including information on song genre of each of the plurality of songs;

song selecting means for selecting a song desired to be sung form the plurality of songs;

music playing means for playing music of the song selected by the song selection means based on the information stored in the music information storing means;

a plurality of image storing means each for storing a plurality of image unit groups of a plurality of image genres, each image group being constructed from a plurality of image units having a corresponding image content;

a plurality of image reading means each for reading out image units from a corresponding one of the plurality of image storing means;

control means for controlling the plurality of image reading means to randomly select image units one after another from at least one image unit group of at least one image genre corresponding to the song genre of the selected song which is stored in the corresponding image storing means to thereby produce a series of image units of image genre corresponding to the song genre; and displaying means for displaying the series of image units, in synchronization with the music played by the music playing means.

18. An image karaoke device of claim 17, wherein the plurality of image storing means include a plurality of video disks each for storing a plurality of image units, and wherein the plurality of image reading means include a plurality of disk playing portions each for selecting and reproducing image units stored in a corresponding one of the plurality of video disks.

19. An image karaoke device of claim 18, wherein the control means controls the plurality of disk playing portions, one after another, to randomly select and reproduce the image units from the corresponding at least one image genre stored in the corresponding video disks, to thereby cause the displaying means to consecutively display the image units of the corresponding at least one image genre from the plurality of video disks.

20. An image karaoke device of claim 15, wherein the control means includes disk playing portion random selecting means for randomly selecting the disk playing portions one after another from the plurality of disk playing portions to cause the randomly selected disk playing portions to successively reproduce the image units stored in the corresponding video disks.

21. A karaoke image display apparatus, for displaying a series of images in synchronization with the music, comprising:

a plurality of video disks for storing a plurality of images of a plurality of image genres;

music information storing means for storing a plurality of songs of a .plurality of song genres;

genre determining means for determining at least one image genre and at least one song genre to be reproduced;

random selecting means for randomly selecting several video disks one after another from the plurality of video disks and for successively reproducing images of the determined image genre from the randomly selected video disks; and displaying means for displaying a series of the successively reproduced images of the determined image genre in synchronization with the determined song genre.

22. A karaoke displaying apparatus of claim 21, wherein the random selecting means includes;

a plurality of reproducing means each for reproducing images from corresponding at least one video disk;

selecting means for selecting the reproducing means one after another from the plurality of the reproducing means; and disk random selecting means for controlling each of the selected reproducing means to randomly select a video disk out of the corresponding video disk and to reproduce images of the determined image genre from the selected video disk.

23. A karaoke displaying apparatus of claim 21, wherein the random selecting means includes;

a plurality of reproducing means each for reproducing images from corresponding at least one video disk;

selecting means for randomly selecting the reproducing means one after another from the plurality of the reproducing means; and disk selecting means for controlling each of the randomly selected reproducing means to select a video disk out of the corresponding video disk and to reproduce images of the determined image genre from the selected video disk.

24. An image displaying apparatus of claim 21, wherein each of the plurality of video disks stores a plurality of image units, and wherein the random selecting means includes image unit selecting means for selecting and reproducing an image unit from the plurality of image units of each of the randomly selected video disks.

* * * * *